United States Patent Office 3,494,907
Patented Feb. 10, 1970

---

3,494,907
FUNCTIONAL POLYMERS OF HETEROCYCLIC N-VINYL MONOMERS AND PROCESS OF PREPARING THE SAME
Ashot Merijan, Wayne, Eugene S. Barabas, Watchung, and Marvin M. Fein, Westfield, N.J., assignors to GAF Corporation, a corporation of Delaware
No Drawing. Filed Oct. 3, 1967, Ser. No. 672,449
Int. Cl. C08f *5/00, 27/08, 27/00*
U.S. Cl. 260—88.3       8 Claims

ABSTRACT OF THE DISCLOSURE

Functional polymers of heterocyclic N-vinyl monomers are obtained by the amino-alkylation or hydroxy-alkylation of preformed homopolymers of heterocyclic N-vinyl monomers. The amino- or hydroxy-alkylated polymers are readily obtained by reacting 1 mole of a homopolymer of a heterocyclic N-vinyl monomer with 0.01 to 2.0 moles of an α-olefinic alcohol or α-olefinic amine in solution of an inert organic solvent common to the homopolymer, α-olefinic alcohol and α-olefinic amine, in the presence of 0.03 to 0.5 mole of an organic peroxide catalyst per mole of α-olefinic alcohol or α-olefinic amine at a temperature from about 80° C. to about 200° C. for a period of time ranging from about 3 to about 20 hours.

---

We have found that polymers of heterocyclic N-vinyl monomers are readily aminoalkylated or hydroxyalkylated by reacting 1 mole of a homopolymer of a heterocyclic N-vinyl monomer with 0.01 to 2.0 moles of an α-olefinic alcohol such as allyl alcohol, 3-buten-1-ol, 4-penten-1-ol, 5-hexen-1-ol, 5-hexent-2-ol, and the like, or with an α-olefinic amine such as allylamine, 1-amino-3-butene, 1-amino-4-pentene, 2-amino-4-pentene, 1-amino-5-hexene, and the like in solution of an organic solvent diluent common to the homopolymer, said alcohol and said amine, in the presence of 0.03 to 0.5 mole of and organic peroxide catalyst per mole of said alcohol or said amine at a temperature ranging from about 80° C. to about 200° C. for a period of time ranging from about 3 to about 20 hours.

The foregoing α-olefinic alcohols and amines are readily obtained by procedures described in the chemical literature.

It is to be noted that any α-olefinic alcohol or amine may be employed, regardless of the carbon chain length, so long as it contains an ethylenic unsaturation in alpha position.

For the purpose of the foregoing reaction, it is essential that the homopolymers of the heterocyclic N-vinyl monomers be constituted of a 5-, 6-, or 7-membered heterocyclic ring system and such ring system contain at least one carbonyl group adjacent to the nitrogen atom thereof.

The organ solvent diluent may be removed from the reaction by vacuum distillation or the solution of the aminoalkylated or hydroxyalkylated polymer may be employed as such. The aminoalkylated or hydroxyalkylated polymer may also be removed from the reaction by precipitation with petroleum ether and the reaction product washed with petroleum ether and dried in a vacuum oven.

When a homopolymer of a 5-, 6-, or 7-membered heterocyclic N-vinyl monomer is subjected to the foregoing reaction, the resulting polymeric product (functional polymer) will contain from 0.01 to 2.0 milliequivalents per gram of product of hydroxyalkyl or aminoalkyl groups directly attached to the carbon atom alpha to the carbonyl and also attached to the carbon atom alpha to the nitrogen if such carbon atom is not substituted by a lower alkyl group.

It is the presence of the hydroxyalkyl or the aminoalkyl groups in the polymers prepared in accordance with the foregoing reaction that lends such polymers to further reactions such as cross-linking with maleic anhydride and the like to yield a new and useful class of polymeric resins.

The homopolymers of heterocyclic N-vinyl monomers that are aminoalkylated or hydroxyalkylated in accordance with the present invention are those which contain 1 or 2 carbonyl groups adjacent to the nitrogen atom in the heterocyclic moiety, such as, for example, homopolymers of N-vinyl succinimide, N-vinyl diglycolylimide, N-vinyl glutarimide, N-vinyl-3-morpholinone, N-vinyl - 5-methyl-3-morpholinone, N-vinyl-5-ethyl-3-morpholinone, N-vinyl oxazolidone, etc., and N-vinyl 5-, 6- and 7-membered lactams characterized by the following formula:

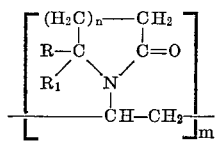

wherein R and $R_1$ are selected from the group consisting of hydrogen, methyl and ethyl, $n$ is an integer of from 1 to 3, and $m$ represents the average molecular weight as determined by relative viscosity measurements which are designated as K values.

The viscosity coefficient K, which is fully described in Modern Plastics, 23, No. 3, 157–61, 212, 214, 216 and 218 (1945) is calculated as follows:

$$\frac{\text{Log } \eta\text{rel}}{c} = \frac{75K_o^2}{1+1.5K_{oo}} + K_o$$

where $c$ is the concentration in grams per 100 ml. of polymer in solution and the $\eta$rel is the viscosity of the solution compared to solvent.

Other homopolymers containing a lactam ring that are aminoalkylated or hydroxyalkylated include those prepared by homopolymerization of comparable monomers of N-vinyl 5-, 6- and 7-membered thiolactams.

The homopolymers of the N-vinyl lactams characterized by the foregoing formula are readily obtained by homopolymerizing N-vinyl pyrrolidone; N-vinyl-5-methyl pyrrolidone; N-vinyl-5-ethyl pyrrolidone; N-vinyl-5,5-dimethyl pyrrolidone; N-vinyl-5,5-diethyl pyrrolidone and N-vinyl-5-methyl-5-ethyl pyrrolidone; N-vinyl piperidone; N-vinyl-6-methyl piperidone; N-vinyl-6-ethyl piperidone; N-vinyl-6,6-dimethyl piperidone; N-vinyl-6,6-diethyl piperidone and N-vinyl-6-methyl-6-ethyl piperidone; N-vinyl caprolactam, N-vinyl-7-methyl caprolactam; N-vinyl-7,7-dimethyl caprolactam; N-vinyl-7-ethyl caprolactam; N-vinyl-7,7-diethyl caprolactam and N-vinyl-7-methyl-7-ethyl caprolactam.

For the purpose of the present invention we employ homopolymers of heterocyclic N-vinyl monomers having a K value ranging from about 10 to 140, preferably from about 15 to 90. These homopolymers are readily obtained by conventional homopolymerization procedures of the foregoing heterocyclic N-vinyl monomers as described in U.S. Patents 2,265,450; 2,317,804; 2,335,454 and many others too numerous to mention in which working examples are given.

As the organic solvent which is common to the foregoing homopolymers employed in the reaction with α-olefinic alcohols and α-olefinic amines, various alcohols, such as methanol, ethanol, propanol, isopropanol, butanol, sec-butanol, amyl alcohol, hexanol, 2-ethyl-1-hexanol, ethylene glycol, 1,2-butanediol, 4-butanediol, etc., may be employed. Other non-reactive solvents such as diethylene glycol, ethylene glycol monomethyl ether and the like may also be employed. It is to be noted that the nature or character of the organic solvent is immaterial so long as it forms a solution with the polymer and a solution of the α-olefinic alcohol or amine and does not enter into the reaction to any measureable extent.

As peroxide catalysts (initiators) for the reaction of the homopolymer of heterocyclic N-vinyl monomer, under the foregoing reaction conditions, any one of the known tertiary-alkyl organic peroxides and hydroperoxides such as, for example, di-t-butyl peroxide, t-butyl perbenzoate, di-t-butyl perphthalate, t-butyl pentamethylethyl peroxide, t-butyl-triphenylmethyl peroxide, di-t-amyl peroxide, bis-(triethylmethyl) peroxide, bis-(triphenylmethyl) peroxide, 2,5-dimethylhexyl-2,5-dihydroperoxide, 2,5-dimethyl-2,5-di(t-butyl peroxy) hexane, 2,5-dimethylhexyl-2,5-di(peroxy benzoate), t-butyl hydroperoxide, para-menthane hydroperoxide and the like may be used.

Whether a homopolymer is reacted with the α-olefinic alcohol or amine, the reaction may be carried out either at reflux or in a stainless steel shaker bomb. A solution of the homopolymer in the α-olefinic amine or alcohol, the organic solvent and peroxide catalyst in the proportions aforestated is heated at reflux or charged to the bomb and purged with nitrogen and sealed. The bomb is then heated and maintained at the same temperature and for the same period of time as noted above.

The pressure developed in the bomb may range from 10 to about 500 p.s.i.g. After cooling the contents of the bomb to room temperature, they are discharged and the aminoalkylated or hydroxyalkylated polymer recovered from the solution by precipitation by petroleum ether, washing once or twice with petroleum ether and drying the product in a vacuum oven for a minimum of 5–10 hours. Instead of precipitation with petroleum ether, the contents of the bomb may be cooled to room temperature and discharged into any suitable distillation equipment to remove the solvent and the product dried in any conventional manner, preferably in a vacuum oven.

When 1 mole of a homopolymer of a heterocyclic N-vinyl monomer is reacted with 0.01 to 2.0 moles of either α-olefinic alcohol or amine under the foregoing reaction conditions, the resulting polymeric product will contain from 0.01 to 2.0 milliequivalents of amine or hydroxy functionality per gram of the polymeric product or from 0.1 to 20.0 mole percent of reacted α-olefinic amine or α-olefinic alcohol in the polymeric product.

The aminoalkylated and hydroxyalkylated polymers prepared in accordance with the present invention are useful in the preparation of various curable coatings having good water and organic solvent resistance. They are also useful as complexing agents for metals and phenolic compounds.

The following examples will show how the functional polymers of heterocyclic N-vinyl monomers are prepared. All parts given are by weight unless otherwise noted.

EXAMPLE I

A 1-liter stainless steel shaker bomb was charged with a solution of the following ingredients:

Poly (N-vinylpyrrolidone) (K–30)=222.0 grams (2.0 moles)
Allyl amine=20.0 grams (0.35 mole)
Isopropanol=300.0 grams (solvent)
Di-t-butylperoxide=15.0 grams (0.1 mole)

The bomb was then purged with nitrogen and sealed. It was heated with shaking and maintained at 130–140° C. for 16 hours. After cooling and venting, the contents were removed and the product precipitated by pouring the reaction mixture into 1500 mls. petroleum ether. The precipitated product was washed twice with 1000-ml. portions of petroleum ether and finally dried in vacuum oven at 100–110° C. for two days. The dry product thus obtained was a light yellow brittle solid weighing 215 grams and of 99.4% solids. Titration of the product with a standard aqueous CHl solution (down to pH 4.4), showed 0.50 milliequivalents of amine per gram of product, corresponding to 5.0 mole percent of reacted allyl amine in the product.

EXAMPLE II

Into a 1-liter polymerization kettle equipped with mechanical stirrer, thermometer, gas inlet tube and reflux condenser, there was charged 200 grams of methyl isobutyl carbinol, followed by 222 grams of (2.0 moles) poly(vinyl pyrrolidone) having a K value of 30, and the mixture heated to 60° C. and maintained at this temperature until a clear solution was obtained. The system was purged thoroughly with nitrogen and 26.6 grams '0.18 mol) of ditertiary butylperoxide were added and the mixture heated to gentle reflux and kept there for 19 hours. Thereafter the temperature was lowered to 60° C. and 83 grams (1.4 mole) of allyl alcohol was introduced. The temperature was then increased to 98° C. and maintained for 12 hours. The reaction solution was solution was subjected to vacuum distillation and about 160 grams of methyl isobutyl carbinol was added. The distillation residue was poured into a dish and placed in a vacuum oven at 100° C. for 24 hours. The yield of dry product amounted to 182 grams having a hydroxyl number of 49.2, corresponding to 0.87 milliequivalent of hydroxy per gram of sample or 9.7 mole percent of reacted allyl alcohol in the product.

EXAMPLE III

Example I was repeated with the exception that the poly-(N-vinylpyrrolidone) was replaced by 250 grams (2 moles) of poly-(N-vinyl piperidone) K–30. The dry product after titration with standard aqueous HCl solution (down to a pH of 4.4), showed 0.45 milliequivalents of amine per gram of product, corresponding to 5.4 mole percent of the reacted allyl amine in the product.

EXAMPLE IV

Example I was again repeated with the exception that the poly(N-vinylpyrrolidone) and the allyl amine were replaced by 139.2 grams (1 mole) of poly(N-vinyl-ε-caprolactam) K–20 and 58 grams of allyl alcohol. The dry product had a hydroxy number of 75, corresponding to 1.34 milliequivalents of hydroxy per gram of product, equivalent to 16.8 mole percent of the reacted allyl alcohol in the product.

We claim:
1. An amino-alkylated or hydroxyalkylated addition homopolymer of a heterocyclic N-vinyl monomer, having at least one carbonyl group adjacent to the nitrogen atom in the heterocyclic moiety, the heterocyclic monomer being selected from the class consisting of N-vinyl-2-oxazolidone, N-vinyl-3-morpholinone, N-vinyl succinimide, N-vinyl diglycolylimide, N-vinyl glutarimide and monomers of the formula

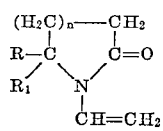

wherein R and $R_1$ are selected from the class consisting of hydrogen, methyl and ethyl, and $n$ is an integer of from 1 to 3, said polymer containing from 0.01 to 2.0 milliequivalents per gram of said polymer of a functional group selected from the class consisting of hydroxyalkyl and aminoalkyl directly attached to the carbon atom alpha to said carbonyl and to the carbon atom alpha to the nitrogen, the said attachment being only on the carbon atom alpha to the nitrogen when R and $R_1$ in said formula are hydrogen.

2. An aminoalkylated or hydroxyalkylated addition homopolymer of a N-vinyl lactam monomer of the formula

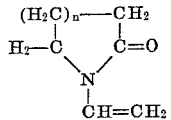

wherein $n$ is an integer of from 1 to 3, containing from 0.01 to 2.0 milliequivalents per gram of said homopolymer of a functional group selected from the class consisting of hydroxyalkyl and aminoalkyl directly attached to the carbon atom alpha to the carbonyl and carbon atom alpha to the nitrogen in the lactam moiety of said homopolymer.

3. A homopolymer according to claim 2 wherein the N-vinyl lactam is N-vinyl pyrrolidone.

4. A homopolymer according to claim 2 wherein the N-vinyl lactam is N-vinyl-2-piperidone.

5. A homopolymer according to claim 2 wherein the N-vinyl lactam is N-vinyl-ε-caprolactam.

6. A homopolymer according to claim 1 wherein the heterocyclic N-vinyl monomer is N-vinyl succinimide.

7. The process of preparing aminoalkylated and hydroxyalkylated addition homopolymers which comprises reacting 1 mole of a homopolymer of a heterocyclic N-vinyl monomer of the class consisting of N-vinyl-2-oxazolidone, N-vinyl-3-morpholinone, N - vinyl succinimide, N-vinyl diglycolylimide, N-vinyl glutarimide, and monomers of the formula

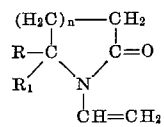

wherein R and $R_1$ are selected from the group consisting of hydrogen, methyl and ethyl, with 0.01 to 2.0 moles of a member of the group consisting of α-olefinic alcohol and α-olefinic amine in solution of an organic solvent common to said homopolymer, α-olefinic alcohol and α-olefinic amine in the presence of 0.03 to 0.5 moles of an organic peroxide per mole of said alcohol or said amine at a temperature ranging from about 80° C. to about 200° C. for a period of time ranging from 3 to 20 hours.

8. The process according to claim 7 wherein the homopolymer of the heterocyclic N-vinyl monomer is poly(vinyl pyrrolidone).

References Cited

UNITED STATES PATENTS

| | | |
|---|---|---|
| 2,667,473 | 1/1954 | Morner et al. |
| 2,695,278 | 11/1954 | Justice. |
| 2,818,362 | 12/1957 | Drechsel. |
| 2,941,980 | 6/1960 | Robinson. |

HARRY WONG, JR., Primary Examiner

U.S. Cl. X.R.

260—32.6, 33,2, 33.4, 78.4